United States Patent [19]
Jensen

[11] Patent Number: 5,098,338
[45] Date of Patent: Mar. 24, 1992

[54] PORTABLE FISH CLEANER DEVICE

[76] Inventor: John A. Jensen, 7315 46th N.E., Seattle, Wash. 98115

[21] Appl. No.: 587,263

[22] Filed: Sep. 24, 1990

[51] Int. Cl.[5] .............................................. A22C 25/06
[52] U.S. Cl. ......................................... 452/194; 43/55
[58] Field of Search .................... 452/194, 185; 43/55, 43/54.1

[56] References Cited

U.S. PATENT DOCUMENTS

| | | | |
|---|---|---|---|
| 2,721,718 | 10/1955 | Wagner | 43/55 |
| 3,561,043 | 2/1969 | Breckenridge | 452/154 |
| 3,590,423 | 7/1971 | Messer | 452/194 |
| 3,668,739 | 3/1972 | Lewis | 452/194 |

Primary Examiner—Willis Little
Attorney, Agent, or Firm—Dean A. Craine

[57] ABSTRACT

A compact, easy to store, portable fish cleaner device capable of removably attaching to the outside surface of the gunwale of a boat. The device includes a v-shaped trough member capable of holding a fish for cutting over the water along the outside surface of the boat. The trough member comprises two angled surfaces pivotally attached along one edge. The ends of the trough member are open and a drain gap is created between the angled surfaces so that fish entails and other waste material may be easily washed into the water. A plurality of support members are attached to the gunwale and support the trough member in place over the water. Support member attachment means are used to removably attach each support member to the outside surface of the gunwale. Hook and loop connectors are provided between the trough member and the support members to adjustably attach them together. In the preferred embodiment, a horizontally flat cutting board is attached to one edge of the trough member enabling one to more easily remove the fish's tail and head.

19 Claims, 4 Drawing Sheets

PORTABLE FISH CLEANER DEVICE

TECHNICAL FIELD

This invention relates to devices used to clean fish. More particularly, this invention relates to devices used to clean fish which can be removably mounted to the gunwale of a boat or a similar structure which folds to a suitable size for easy storage.

BACKGROUND ART

Fisherman often find it desirable to clean their fish shortly after being caught on board their boats. Fish cleaning devices which can hold their fish in a fixed position on the outside of the boat for cleaning have been known for several years.

For example, Breckenridge (U.S. Pat. No. 3,561,043) discloses a boat-mounted holder for cleaning fish comprising a rigid trough structure formed with a vertical plate and an incline plate designed to hold a fish in a fixed position outside the boat. Cords attached at one end to hooks hold the trough structure in place along the outside surface of the boat's gunwale.

Lewis (U.S. Pat. No. 3,668,739) also discloses a fish cleaning trough adapted to be easily mounted to and removed from the gunwale of a boat. The trough, made of rigid material, has opened ends and is suspended over the water as the fish are cleaned. Securing means extend over the top surface of the gunwale to hold the trough over the water.

Heretofore, typical fish cleaning devices have several drawbacks. Most devices use rigid, deep trough structures to hold the fish which are large and bulky and take up valuable storage area on the boat when not in use. In addition, such devices cannot be used on all gunwales and hull designs. Hand rails, molding and ornament designs along the top surface of the gunwale often prevent these devices from being properly attached to the gunwale. The trough structures used with these devices usually presses against the outer surface of the hull during use. If the angle of the hull surface is improper, the device will not be properly positioned over the water.

In some instances, the cutting action and the boat movement can also cause these devices to move laterally along the gunwale making cleaning difficult. Wave action can also vertically lift the trough structure causing it to partially or completely break or dislodge from the gunwale.

Lastly, most fisherman find it desirable to remove the head and tail of the fish during the cleaning process. Typical fish cleaning devices available today do not provide a cutting board surface for removing the head or tail. With these devices, the head or tail must be extended over the trough structure for cutting. A flat cutting board disposed adjacent to the trough structure would be highly desirable.

A fish cleaning device, then, which addresses and resolves these drawbacks would be highly desirable.

DISCLOSURE OF INVENTION

It is a general object of the present invention to provide a fish cleaner device that can be easily mounted or removed from the gunwale of a boat.

It is an object of the present invention to provide a fish cleaner device that requires minimal storage space on the boat when not used.

It is another object of the present invention to provide a fish cleaner device that can be securely attached to the gunwale of a boat and can be used with different hull designs.

It is a still further object of the present invention to provide a fish cleaner device that is both simple to use and economical to manufacture.

These and other objects of the invention, which will become apparent, are accomplished by the device disclosed herein.

The present invention comprises a portable, boat-mounted fish cleaner device capable of holding a fish over the water along the gunwale of a boat. The device may be easily attached to and removed from the outside surface of the gunwale, and conveniently stored in a compact manner on board the boat when it is not in use.

In the preferred embodiment, the device comprises an elongated, v-shaped trough member designed to hold a fish outside and parallel to the gunwale. The trough member includes two angled surfaces pivotally attached along their adjacent longitudinal edges. In one embodiment, a flat cutting board is attached adjacent to the trough member between the gunwale and the trough member enabling one to easily remove the fish's head and tail. The trough member and cutting board are interconnected with two strips of hook and loop connecting tape attached transversely to the bottom surfaces of the trough member and cutting board near each end. The angled surfaces and cutting board are attached so that two drain gaps are formed—one between the two angled surfaces and the other between the inner angled surface and the cutting board. The drain gaps allows the fish's entails to conveniently fall into the water during the cleaning process. The strips of hook and loop connecting tape are flexible and are attached so that the angled surfaces and cutting board may pivot at their attached edges. This enables the angled surfaces to fold open to form the v-shaped trough member during use, and enables the two angled surfaces and cutting board to be folded into one plane for compact storage. The ends of the trough member are open with two cords disposed between the ends of the two angled surfaces which forcibly rotate the angled surfaces together when the fish's tail or head is laid over them. In this manner, the fish may be securely held in the trough member during the cutting process.

A plurality of support members extend perpendicularly from the gunwale and suspend the trough member and cutting board over the water. Each support member includes a complimentary, v-shaped trough member support surface and a horizontal cutting board support surface. An engagement means is integrally formed at one end of each support member which enables the support member to be removably attached to the gunwale. A support member attachment means is rigidly fixed to the outside surface of the gunwale which attaches to the engagement means. In the preferred embodiment, the engagement means is a hook structure formed along the upper surface of the support member. The hook structure's longitudinal axis is horizontally aligned and parallel with the longitudinal axis of the support member. The support member attachment means is a U-shaped support bracket with a central passage through which the hook member is inserted. In addition, each support member has an adjustable support member leveling means which extends from the lower surface to rest against the lower, outer surface of the gunwale. The support member leveling means enables each support member to be properly positioned over the water, and also enables the device to be used with different sloped, hull designs. In one embodiment, the support member leveling means comprises a tongue member that is cut to a desirable length during initial installation.

A strip of hook and loop connecting tape is attached to the top surface of each support member. During use, the strip of hook and loop connecting tape adjustably attaches to the strip of hook and loop connecting tape located on the bottom surface of the trough member and cutting board to securely hold the trough member and cutting board to the support members and prevents any lateral movement.

BEST MODE FOR CARRYING OUT THE INVENTION

Figure 1:
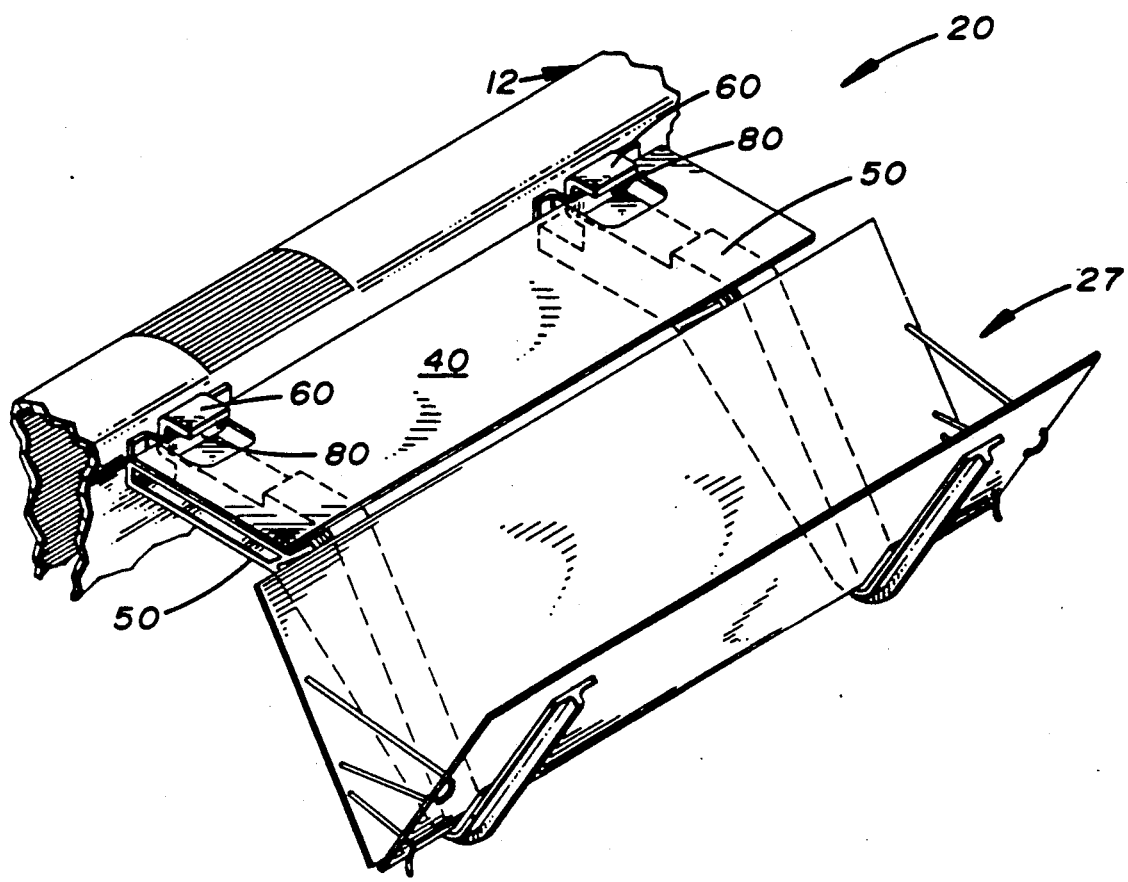
FIG. 1 is a perspective view of the invention.

As shown in FIG. 1, this invention comprises a portable fish cleaner device 20 used to clean fish on the outside surface of the gunwale 12 of a boat. Device 20 comprises an elongated, v-shaped trough member 27 suspended over the water by two laterally extending support members 50. In the preferred embodiment, a flat cutting board 40 is attached adjacent to the trough member 27. Each support member 50 extends over the water substantially perpendicularly from the outside surface of the gunwale 12. An engagement means comprising a hook structure 60 is integrally formed on one end of each support member 50 which slidably engages an attachment means comprising a U-shaped bracket 80 described further below. Bracket 80 is rigidly fixed to the outside surface of the gunwale 12 so that during use, each support member 50 is securely attached and prevented from moving laterally along the gunwale 12.

Figure 2:
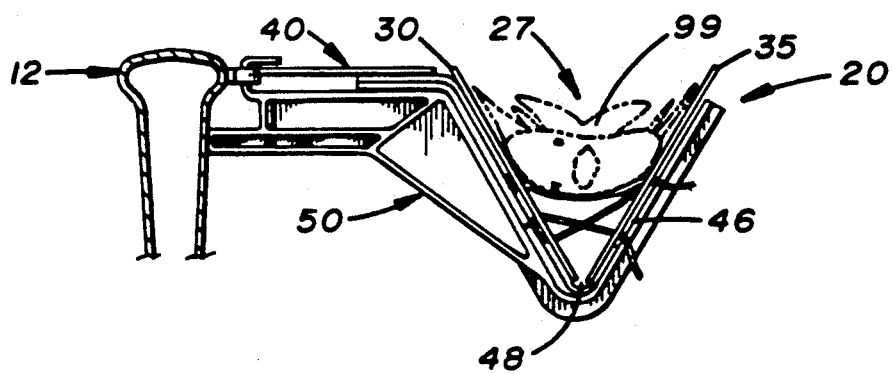
FIG. 2 is a side elevation view of the invention.
Figure 3:
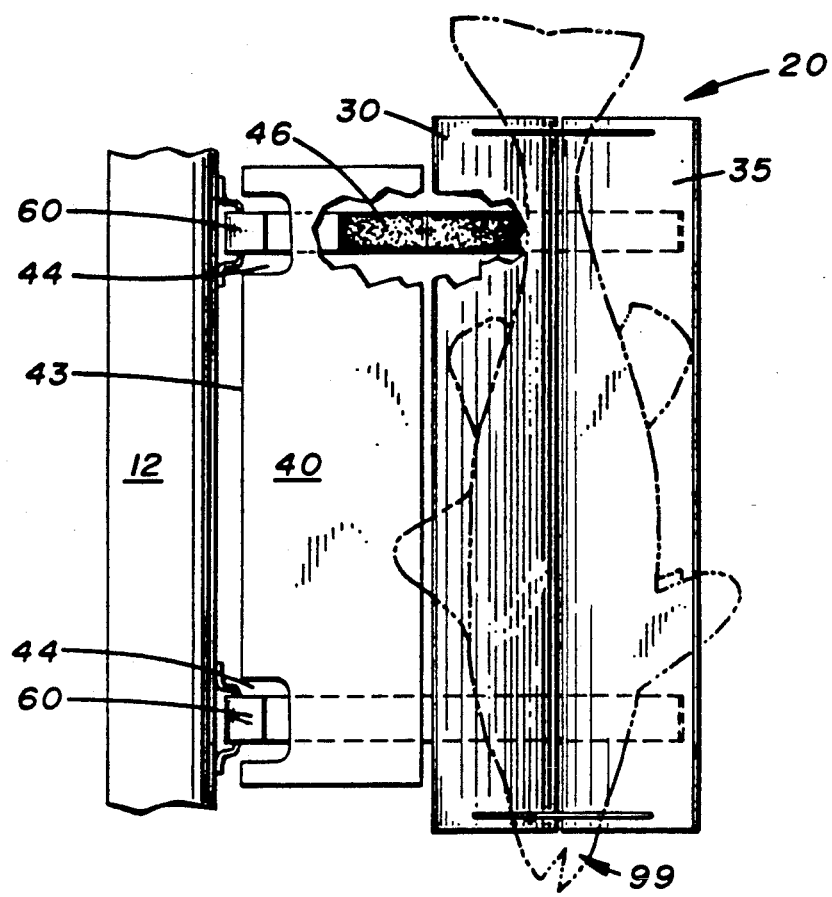
FIG. 3 is a top view of the invention, partially removed.

As seen in FIGS. 2 and 3, trough member 27 comprises two rigid, angled surfaces 30, 35 capable of holding a fish 99 substantially horizontally along the outside surface of a gunwale 12. Angled surfaces 30 and 35 are held in the v-shaped configuration by the two rigid support members 50 suspended below each end of the trough member 27. Cutting board 40 is also supported between the trough member 27 and the gunwale 12 by the two support members 50. Cutting board 40 has two half circular cutouts 44 located along its inside longitudinal edge 43 near each end so that the hook structures 60 discussed further below, may extend through.

Figure 4:
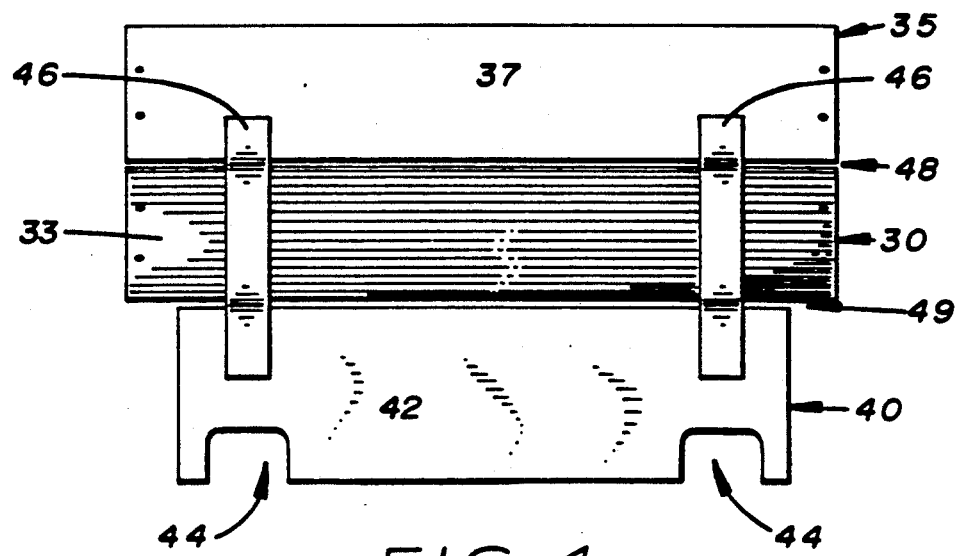
FIG. 4 is a bottom view of the invention.

As shown more clearly in FIG. 4, angled surfaces 30 and 35 and cutting board 40 are interconnected by two strips of flexible hook and loop connecting tape 46 approximately 1 and ¼ inches wide. The strips of hook and loop connecting tape 46 transverses the angled surfaces 30 and 35 and cutting board 40 along the bottom surfaces 33, 37, and 42, respectively. During manufacture, drain gaps 48 and 49 approximately ¼ inches wide, are created between angled surfaces 30 and 35, and between angled surface 30 and cutting board 40, respectively. Drain gaps 48 and 49 enabling waste material generated during the cleaning process to be conveniently removed from the device 20.

Figure 5A:
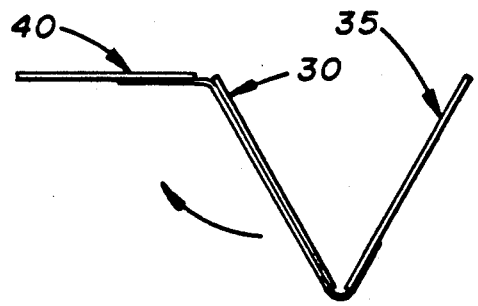
FIG. 5(a), (b) and (c) are side elevation views showing how the trough member and cutting board may be folded into one plane for compact storage.
Figure 5B:
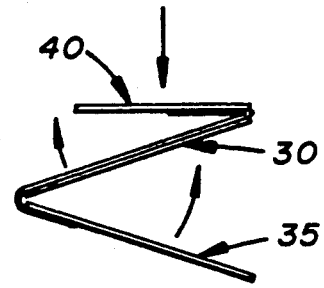
Figure 5C:
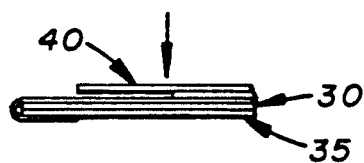

The strips of hook and loop connecting tape 46 is sufficiently flexible so that angled surfaces 30 and 35, and angled surface 30 and cutting board 40, may be pivoted along their adjacent edges. As shown in FIGS. 5(a), (b) and (c), this enables angled surfaces 30 and 35 and cutting board 40 and angled surface 30 to be folded into one plane for compact storage.

The angled surfaces 30, 35 and cutting board 40 may be manufactured in various lengths to hold different size fish. In the preferred embodiment, angled surfaces 30 and 35 and cutting board 40 are made of lightweight, durable material, such as acrylonitrile butadiene styrene resin, also known as ABS plastic.

Figure 6:
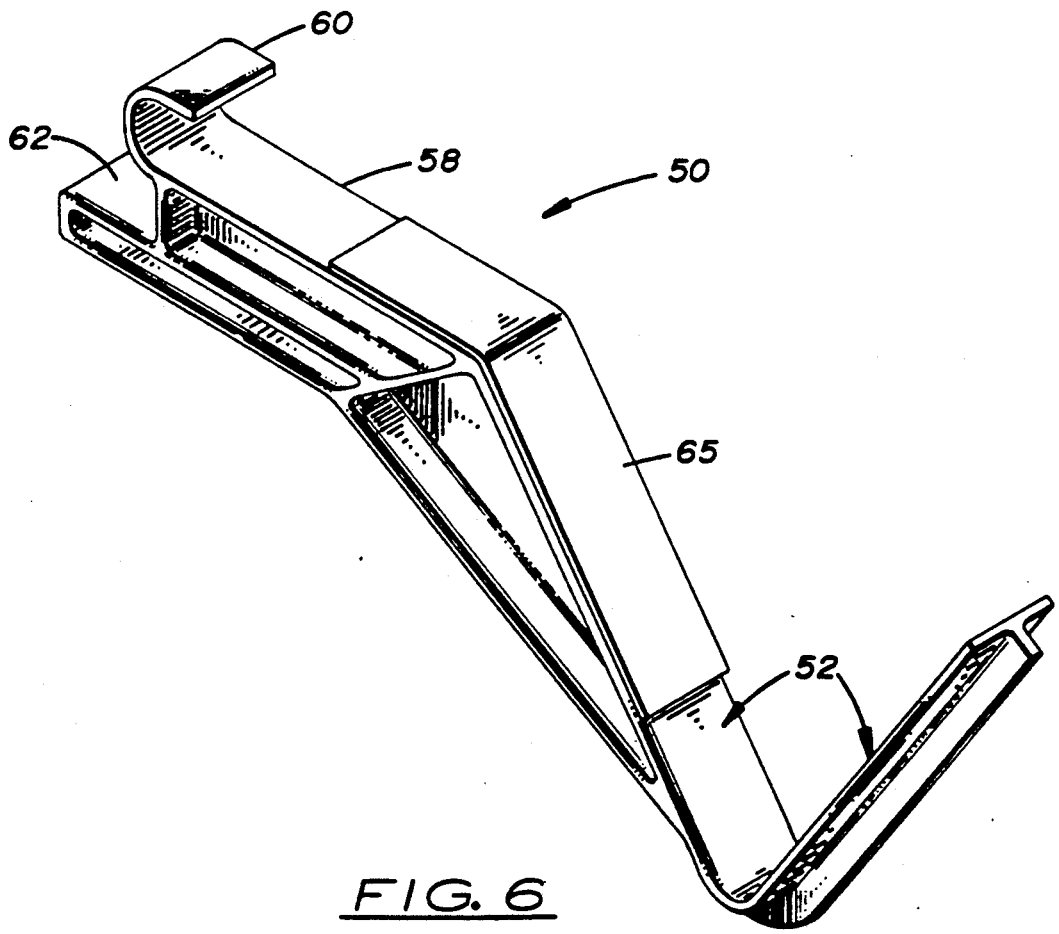
FIG. 6 is a perspective view of a support member.

As shown in FIG. 6, each support member 50 comprises complimentary, v-shaped trough member support surface 52, a flat cutting board support surface 58, an engagement means comprising a hook structure 60, and an adjustable support member leveling means comprising a tongue member 62. Hook structure 60 is manufactured with its longitudinal axis horizontally aligned and substantially parallel to the longitudinal axis of support member 50. By aligning the hook structure 60 in this manner, support member 50 must be simultaneously raised slightly on one end and moved inwardly in order to be detached from the gunwale 12. This simultaneous movement prevents typical wave action from detaching the support members 50 from the gunwale 12.

A hook and loop connecting tape 65 is attached along the cutting board support surface 58 and partially down the inner leg of trough member support surface 52. Hook and loop connecting tapes 65 are approximately ⅜ inches wide and 7 inches long. As shown in FIG. 3, during installation, hook and loop connector tapes 46 and 65 are aligned and interconnected to securely hold the trough member 27 and cutting board 40 in place. By using hook and loop connecting tape 46 and 65, cutting board 40 and trough member 27 may be easily attached and detached from the support members 50. Also, hook and loop connecting tape 46 and 65 prevents lateral movement of the cutting board 40 and trough member while attached to the support members 50. They have also been found to be durable, resistant to salt water, and sufficiently strong enough to withstand the forces caused by mild wave action.

Figure 7:
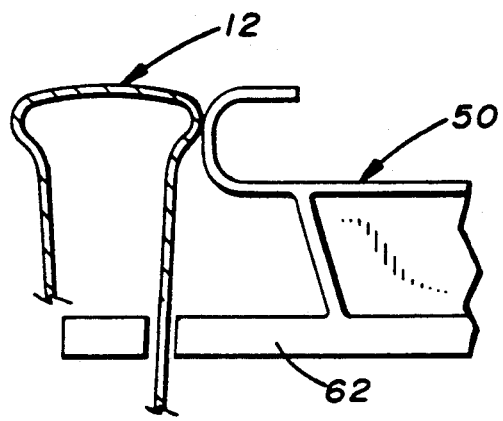
FIG. 7 is a side elevation view of the support member shown in FIG. 6 showing the tongue member cut to size to properly position the support member on the gunwale.

The tongue member 62 is manufactured on the lower section of each support member 50 which acts to properly position the trough member support surface 52 over the water and horizontally align cutting board support surface 58. As shown in FIG. 7, during initial installation of device 20, the exact length of tongue member 62 is determined and then cut to proper size. This adjustable feature, enables device 20 to be used on different sloping gunwales or hull designs.

Each support member 50 is made of strong, lightweight, salt water resistant material such as acrylonitrile butadiene styrene resin, also known as ABS plastic. Alternatively, support member 50 may be manufactured with aluminum or stainless steel.

Figure 8:
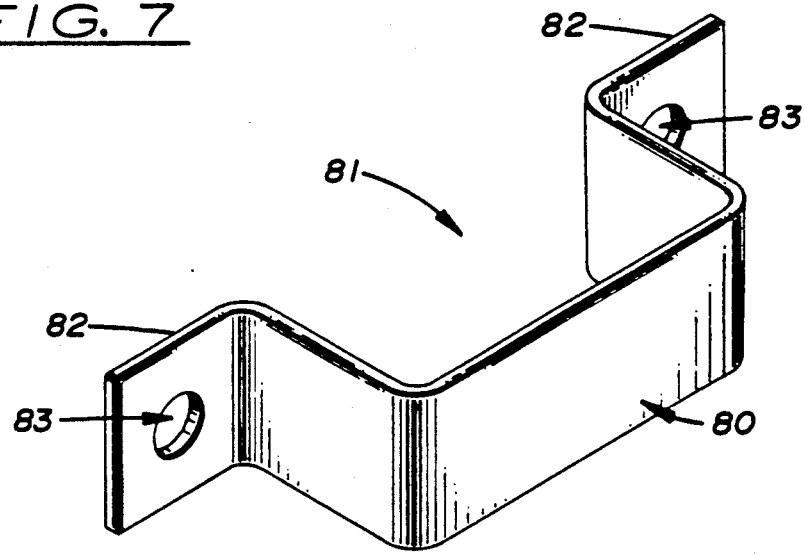
FIG. 8 is a perspective view of a U-shaped bracket.

U-shaped bracket 80 is used to attach each support member 50 to the outside surface of the gunwale 12. As shown in FIG. 8, each bracket 80 has a central passageway 81 through which the upper portion of hook member 60 may be extended. The inside top and bottom surfaces of the hook structure 60 presses against the U-shaped bracket 80 and thereby prevents little or no vertical movement of the support member 50. Holes 83 are manufactured in each flange 82 to permanently fix bracket 80 to the gunwale 12. U-shaped bracket 80 is made of strong, salt water resistant material, such as aluminum or stainless steel.

Figure 9:
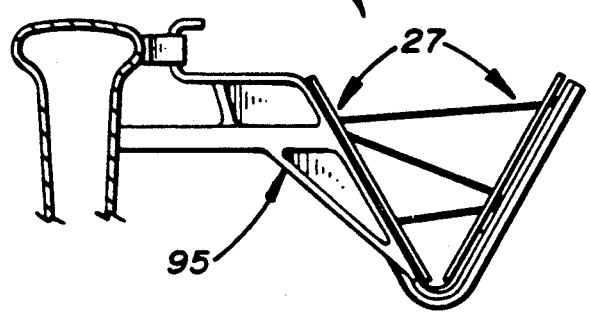
FIG. 9 is a side elevation view showing a second embodiment of this invention.

In FIG. 9, a second embodiment of the invention is shown with device 90 comprising trough member 27 with no cutting board. Support member 95 is modified with no cutting board support surface as shown with support member 50.

To use device 20, two U-brackets 80 are attached in the desired location to the outside surface of the gunwale. The U-brackets 80 are spaced apart so that when the support members 50 are attached to the brackets 80, the hook and loop connectors 46 and 65 are properly interconnected. The support members 50 are then attached to the brackets 80 and the tongue members 62 are then measured and cut to proper size.

In operation, the device 20 may be conveniently stored on board the boat and easily attached when the situation arises. The support members 50 are first attached to the U-brackets 80 by inserting hook structures 60 through the passageway 81 located on each bracket 80. The trough member 27 and the cutting board 40 are then unfolded and attached to the support members 50. The strips of hook and loop connectors 46 and 65 are interconnected. The strips 46 and 65 are sufficiently wide so that exact alignment is not required. A fish may then be placed in the trough member 27 for cleaning. As the fish's head or tail is extended across the cord 49 it presses the cord 49 downwardly causing the angled surfaces 30 and 35 to rotate inwardly to securely hold the fish in the trough member 27.

When the fish cleaning operation is completed, device 20 may be quickly and easily removed from the gunwale 12 by first removing the trough member 27 and cutting board 40 from the support members 50. When removed, the support members 50 are then detached from the brackets 80. The trough member 27 and cutting board 40 may be folded into a flat plane for easy and compact storage.

In compliance with the statute, the invention has been described in language more or less specific as to its structural features. It is to be understood, however, that the invention is not limited to the specific features shown since the means of construction herein disclosed describes a preferred form of putting the invention into practice. The invention is therefore claimed in any of its form or modifications within the legitimate and valid scope of the appended claims properly interpreted in accordance with the doctrine of equivalents.

INDUSTRIAL APPLICABILITY

The herein disclosed fish cleaner device will have wide spread use in the sporting and commercial fishing industries. In particular, the device will be especially useful to sports fisherman who want a portable fish cleaning device that can be easily stowed in a compact manner on board the boat, that can be easily attached to the outside surface of the gunwale, and that can be easily attached to various hull designs.

I claim:
1. A portable fish cleaner device, comprising:
   a. an elongated, v-shaped trough member, said trough member including two inwardly angled angled surfaces pivotally attached along one edge, said angled surfaces being capable of pivotally opened to hold a fish to be cleaned and pivotally closed forming a planar structure for compact storage;
   b. a flat cutting board pivotally attached to one edge of said trough member;
   c. a plurality of support members capable of supporting said trough member and said cutting board in a position along the side of the gunwale of a boat, each said support member including a v-shaped trough member support surface for supporting said trough member, a cutting board support surface for supporting said cutting board surface, an engagement means integrally attached at one end for removably attaching said support member to said gunwale, and;
   d. a plurality support member attachment means, each said support member attachment means being capable of removably attaching one end of said support member to said gunwale.
2. A device as recited in claim 1, further comprising a hook structure attached to one said end of said support member for removably attaching said support member to said support member attachment means.
3. A device as recited in claim 2, wherein said support member attachment means is U-shaped bracket.
4. A device as recited in claim 3, wherein said hook is aligned with its longitudinal axis parallel with the longitudinal axis of said support member.
5. A device as recited in claim 4, wherein said U-shaped bracket is made of stainless steel.
6. A device as recited in claim 5, wherein said trough member is attacted to said support members with a hook and loop connector.
7. A device as recited in claim 6, wherein said cutting board is adjustably secured to said support member with said hook and loop connector.
8. A device as recited in claim 1, further comprising a plurality of cords disposed between the ends of said two angled surfaces, said cords being capable of forcibly rotating said angled surfaces together when a portion of said fish is placed over said cord, whereby said fish is securly held in said trough member.
9. A device as recited in claim 1, wherein said trough member is made of acrylonitrile butadiene styrene resin.
10. A device, as recited in claim 9, wherein each said support member is made of acrylonitrile butadiene styrene resin.
11. A portable fish cleaner device, comprising:
   a. an elongated, v-shaped trough member capable of holding a fish, said trough member including two inwardly angled surfaces pivotally attached along one edge, said angled surfaces having a drain gap formed therebetween, said angled surfaces being pivotally attached such that said angled surfaces may be pivotally opened to hold said fish to be cleaned and pivotally closed to form a planar structure for compact storage;
   b. a cutting board pivotally attached to one edge of said trough member;
   c. a plurality of support members capable of supporting said trough member and said cutting board in a position outside the gunwale of a boat, and;

d. a plurality of support member attachment means, each said support member attachment means being rigidly fixed to said gunwale and being capable of attaching one end of said support member to said gunwale.

12. A device as recited in claim 1, further comprising a plurality of cords disposed between the ends of said two angled surfaces, said cords being capable of forcibly rotating said angled surfaces together when a portion of said fish is placed thereover.

13. A device as recited in claim 2, wherein each said support member further comprising:

a. a v-shaped trough member support surface, and;

b. an engagement means integrally formed at one end of said support member enabling said support member to be removably attached to said gunwale.

14. A device as recited in claim 3, said support member further comprising a substantially flat cutting board support surface for supporting said cutting board.

15. A device as recited in claim 4, wherein said support member attachment means is a U-shaped bracket.

16. A device as recited in claim 5, wherein said engagement means is a hook structure capable of slidably engaging said U-shaped bracket.

17. A device as recited in claim 6, further comprising a support member leveling means attached to said support member, said support member leveling means being capable of adjusting the horizontal position of each said trough member support surface and said cutting board support surface.

18. A device as recited in claim 7, wherein said trough member is attached to said trough member support member by a hook and loop connectors.

19. A device as recited in claim 8, wherein said cutting board is attached to said cutting board support surface by hook and loop connectors.

* * * * *